3,014,963
PROCESS OF PRODUCING MEVALONIC ACID
AND ITS INTERMEDIATES
Clifford H. Shunk, Westfield, and Bruce O. Linn and Karl A. Folkers, Plainfield, N.J., assignors to Merck & Co., Inc., Rahway, N.J., a corporation of New Jersey
No Drawing. Filed Nov. 4, 1957, Ser. No. 694,090
3 Claims. (Cl. 260—535)

This invention relates to the production of mevalonic acid and particularly to its method of synthesis from conveniently available starting compounds. The invention also involves the intermediates which are formed in the steps leading to the production of mevalonic acid.

Mevalonic acid is chemically identified as 3-methyl-3,5-dihydroxypentanoic acid. It has been found to be useful as a nutrition material in the growth of animal organisms.

In accordance with our invention the following reaction is first carried out:

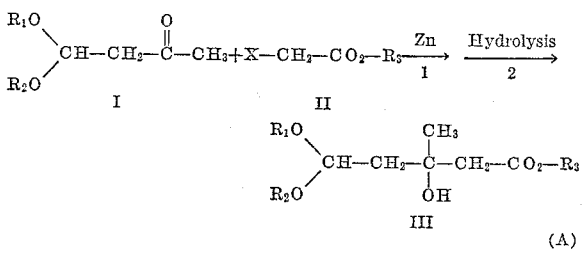

The dialkyl acetal of acetylacetaldehyde (I) is prepared by the formylation of acetone followed by treatment with a lower alkyl alcohol-hydrochloric acid solution as described by E. E. Royals and K. C. Brannock, J. Am. Chem. Soc., 75, 2050 (1953). For convenience the radicals $R_1$ and $R_2$ may be methyl so that the starting compound is acetylacetaldehyde, dimethyl acetal, but, as will appear from the subsequent explanations, it is immaterial what radicals are utilized for $R_1$ and $R_2$ inasmuch as they are subsequently removed and are not present in the mevalonic acid which is to be formed. The invention therefore contemplates the use of various alkyl substituents, preferably those having up to eight carbon atoms, for $R_1$ and $R_2$ but it is apparent that other substituted alkyl radicals such as benzyl radicals may be utilized.

In compound II, the radical X may be any halogen but preferably it will be bromine or chlorine. The radical $R_3$ may be the residue of any esterifying alcohol and preferably this will be a lower alkyl alcohol, such as methanol or ethanol. Here again, the selection of the particular alcohol constituting $R_3$ is immaterial inasmuch as this radical will be removed in the course of the process and will not appear in mevalonic acid.

The reaction mixture is treated with acid to bring about the hydrolysis step 2, and the compound III, which is an ester of 3-hydroxy-3-methyl-5,5-dialkyloxypentanoic acid, is recovered.

The compound III is then subjected to the reaction which may be expressed as follows:

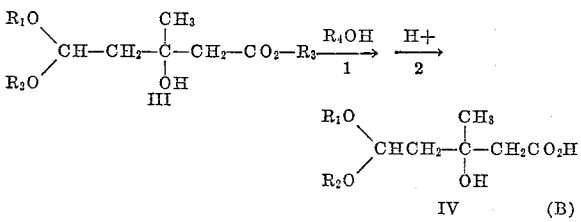

As indicated by the arrow identified as 1, a strong inorganic base is used. For convenience this will preferably be sodium hydroxide or potassium hydroxide, but as the radical $R_4$ is removed by step 2, it is apparent that $R_4$ may be any cation which will be removed by the acidification of step 2. After a solution is obtained it is acidified with an acid as indicated by the arrow 2. The compound IV, which is 3-hydroxy-3-methyl-5,5-dialkyloxypentanoic acid, may be recovered for further processing, but to obtain a final product of purer quality the following is carried out upon the reaction mixture.

To obtain compound IV in purer form it is converted to the N,N'-dibenzylethylenediamine (DBED) salt as follows:

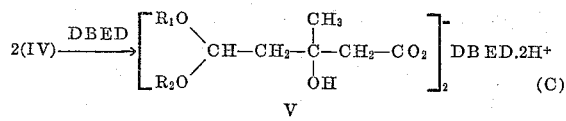

The compound V which is obtained is the DBED salt of 3-hydroxy-3-methyl-5,5-dialkoxypentanoic acid, and it separates out in crystalline form. In order to remove the DBED acid component from compound V the following reaction is carried out:

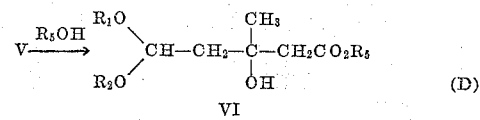

This involves combination with a strong inorganic base material represented by $R_5OH$, such as potassium hydroxide or sodium hydroxide. The cation of this base material constitutes the salt forming element of compound VI. It should be observed here that inasmuch as this cation $R_5$ subsequently will be removed in order to form the mevalonic acid which is finally desired, the particular nature of this cation $R_5$ is relatively unimportant. It obviously may be any alkali material or alkaline earth metal for example. The product VI is recovered and it will be observed to be a salt of compound IV.

To remove this cation from compound VI and to also remove the acetal groups, it is combined with a strong acid which preferably is an inorganic acid such as hydrochloric acid or sulfuric acid. This is indicated by the following reaction:

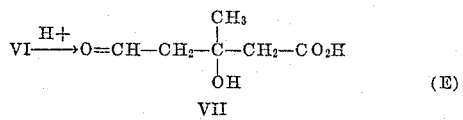

An observation of compound VII shows that it is unimportant what radicals constituted $R_1$ and $R_2$ in the acetal in the starting compound I, and it is also evident that it is immaterial what radicals were selected as $R_3$, $R_4$ and $R_5$ inasmuch as they have been eliminated from the intermediate compounds to obtain the compound VII. The compound VII is 3-hydroxy-3-methyl glutaraldehydic acid, or mevaldic acid.

To convert the terminal aldehyde group of compound VII to the desired alcohol a reductive step is carried on as is indicated by the following:

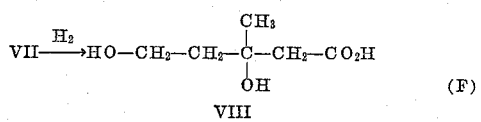

This, for example, may involve the addition of hydrogen in the presence of a catalytic material such as Raney nickel or platinum, or it may involve the addition of hydrogen by the use of sodium borohydride. The compound VIII is the desired mevalonic acid having the chemical name 3-methyl-3,5-dihydroxypentanoic acid.

Instead of the Reactions D and E, the acetal DBED salt V can be directly converted to the aldehyde VII by passing it through an acid exchange resin column. For example, this may be the cation exchange resin which is sold under the trademark Amberlite IR120. This is indicated as follows:

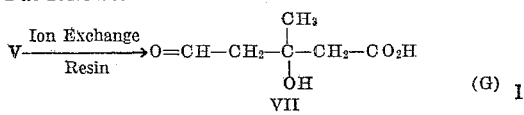

This aldehyde VII can, of course, be reduced to mevalonic acid by the Reaction F above. The Step C using DBED can be eliminated if mevalonic acid of high purity is not vital. In this case, Step B can be followed directly by Steps E and F. Or, Step B can be followed directly by Steps G and F.

As a part of this invention, observation has been made that the aldehyde compound VII may undergo spontaneous dehydration upon prolonged standing in dilute aqueous acid, as is indicated by the following:

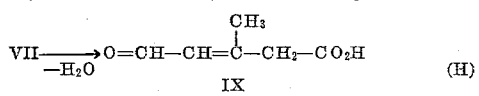

The Reaction H can also be brought about in a short time in the presence of a more concentrated acid.

The compound IX, 3-methyl-5-aldo-3-pentenoic acid may, however, be transformed to the desired mevalonic acid (VIII) by the two step reactions indicated by the following:

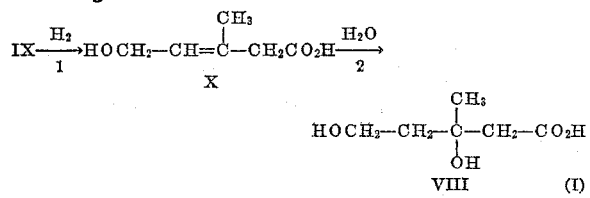

The reduction step indicated by the arrow 1, may be carried on, preferably, by the use of sodium borohydride, but the addition of hydrogen in the presence of a hydrogen addition catalyst, may be employed. This produces the dehydro mevalonic acid X, which may be converted to mevalonic acid by the addition of water into the molecule as is indicated by the arrow 2.

The invention will be further illustrated by the following examples, it being understood that radicals selected to represent $R_1$, $R_2$, $R_3$, $R_4$ and $R_5$ are only suggestive of the radicals which they may represent and which are broadly defined above.

EXAMPLE I

*Preparation of ethyl 3-hydroxy-3-methyl-5,5-dimethoxypentanoate.—Reaction A*

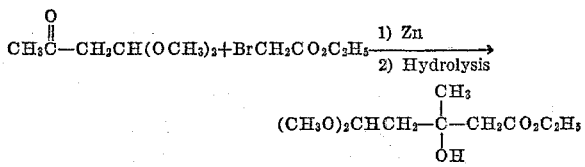

Granular zinc, 19.6 g., (0.30 mole) was cleaned by washing successively with 3% hydrochloric acid, water, water with a trace of mercuric chloride (it has been reported that a trace of mercuric chloride promotes immediate initiation of the reaction), water, acetone and benzene. The last traces of water were azeotropically removed from the zinc by distillation of the benzene to dryness. The zinc was just covered with dry ether (dried over sodium) and a small portion of a solution containing 19.8 g. (0.15 mole) of acetylacetaldehyde dimethyl acetal and 26.6 g. (0.16 mole) of freshly distilled ethyl bromacetate (Matheson) in 75 ml. of dry ether was added. After the reaction had begun, the remaining solution of reactants was added dropwise at a rate to maintain reflux. The stirred mixture was refluxed for 2 hours longer.

The mixture was then acidified by decanting from the unreacted zinc into a separatory funnel containing 11.5 ml. (0.20 mole) of glacial acetic acid and 100 ml. of iced water. All the following aqueous solutions were kept cold by addition of crushed ice. After the initial shaking, 100 ml. of ether was added and the shaking continued. This ether layer and the next, obtained from a second ether extraction, were washed immediately with 200 ml. of iced saturated sodium bicarbonate solution. A single ether extraction of the cold bicarbonate solution was added to the main portion of ether which was then washed once with cold water. A single ether extraction of this washing was added to the main portion and the combined etheral solution was dried over magnesium sulfate. After concentration using gentle heaing (60–70°) and by employing water vacuo, the liquid residue was distilled through a short Claisen column (exposure to prolonged heating or high temperatures at this point caused decomposition of the product) giving 26—36% yields of ethyl 3-hydroxy-3-methyl-5,5 - dimethoxypentanoate, B.P. 61–63° at 0.10 mm. $n_D^{25}$ 1.4353—1.4373.

*Analysis.*—Calcd. for $C_{10}H_{20}O_5$: C, 54.53; H, 9.15. Found: C, 54.79; H, 8.95.

*Preparation of N,N'-dibenzylethylenediammonium bis-(3-hydroxy-3-methyl - 5,5 - dimethoxypentanoate).—Reactions B and C*

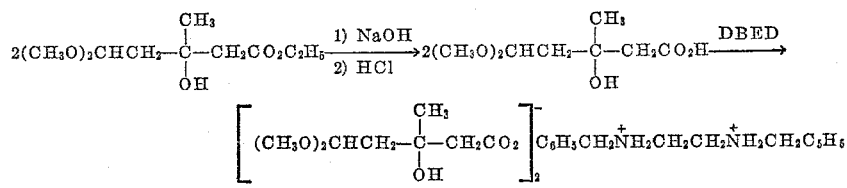

To 8.05 g. (36.8 Mmole) of ethyl 3-hydroxy-3-methyl-5,5-dimethoxypentanoate was added 50.0 ml. of 1.00N sodium hydroxide (50.0 Mmole). The organic layer reacted and went into solution very rapidly. After the mixture had been stirred for 30 minutes at room temperature, the solution was diluted with 50 ml. of water, cooled in an ice bath, and neutralized with 49.5 ml. of cold 1.00N hydrochloric acid (49.5 Mmole). This solution was immediately frozen and lyophylized. As soon as the lyophylization had been completed, the residue was extracted with ether. The combined ether extracts were dried briefly over $MgSO_4$ and then treated with a solution of 4.42 g. (18.4 Mmole) of N,N'-dibenzylethylenediamine in 30 ml. of ether. The precipitated salt was allowed to stand at 4° over the weekend and then collected and washed with ether giving 8.40 g. of product, M.P. 104–105° with softening at 99°. The yellowish powder was dissolved in hot chloroform, treated with Darco, and then diluted with petroleum ether (30–60°) to incipient cloudiness. After cooling, the solid was collected, washed with ether and dried giving 7.67 g. (67%) of N,N'-dibenzylethylenediammonium bis - (3 - hydroxy-3- methyl-5,5-dimethoxypentanoate), M.P. 104.5–106°. The analytical sample melted at 107–107.5°.

*Analysis.* Calcd. for $C_{32}H_{52}N_2O_{10}$: C, 61.52; H, 8.39; N, 4.48. Found: C, 61.32; H, 8.73; N, 4.60.

*Preparation of 3-methyl-3,5-dihydroxypentanoic acid (mevalonic acid) from N,N'-dibenzylethylenediammonium bis-(3-hydroxy-3-methyl - 5,5 - dimethoxypentanoate).—Reactions D, E and F*

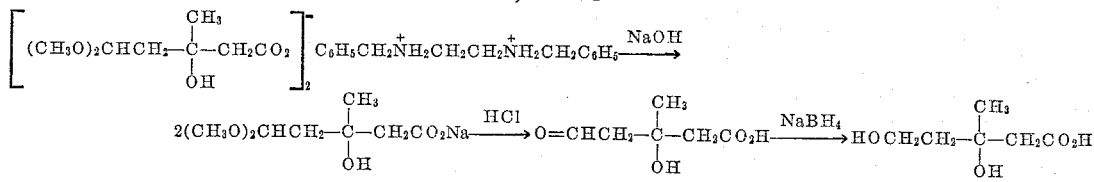

N,N' - dibenzylethylenediammonium bis-(3-hydroxy-3-methyl-5,5-dimethoxypentanoate) (420 mg.) was dissolved in 5 ml. of water and 16 ml. of 0.10N sodium hydroxide was added. The mixture was extracted with three portions of ether to remove the N,N'-dibenzylethylenediamine. The aqueous solution containing the sodium salt of the dimethyl acetal of 3-hydroxy-3-methyl glutaraldehydric acid was acidified by the addition of 5.0 ml. of 1N hydrochloric acid (final volume 30 ml.) This solution was kept at room temperature (26°) for 5 hours.

The resulting solution containing 3-hydroxy-3-methyl glutaraldehydic acid was neutralized with sodium hydroxide and the aldehyde was reduced with sodium borohydride (30 mg. of sodium borohydride in 3 ml. of 0.1N sodium hydroxide). After ten minutes the excess sodium borohydride was decomposed by the addition of hydrochloric acid. The resulting solution was lyophilized. Two 10 ml. portions of chloroform were added and evaporated under reduced pressure. The residue was extracted with three 20 ml. portions of chloroform. The combined extracts were evaporated under reduced pressure. The residual oil (140 mg.) contained the desired mevalonic acid, but to further purify it the following procedure was carried on. The oil was dissolved in 2 ml. of water and 130 mg. of N,N'-dibenzylethylenediamine in 3 ml. of methanol was added. The solution was kept at room temperature overnight. The methanol was evaporated under reduced pressure and the aqueous solution was extracted with three 1 ml. portions of chloroform. The chloroform extracts were combined and extracted with three 1 ml. portions of water. These extracts were combined with the first aqueous solution and the solution was evaporated under reduced pressure giving 195 mg. of an oil. This was dissolved in 1.5 ml. of methanol and 10 ml. of ether was added. The mixture was kept at 4° overnight and the crystalline material was collected, M.P. 123–125°, weight 106 mg. Recrystallization from methanol-ether raised the melting point to 125–127°. The melting point of a mixture of this compound and N,N'-dibenzylethylenediammonium bis (DL-mevalonate) was not depressed. The infrared spectra of the compound was also identical with that of N,N'-dibenzylethylenediammonium bis (DL-mevalonate).

The DL-mevalonic acid is obtained from the DBED salt by passing it through a resin as described in paragraph 1 of Example II.

Before proceeding, the solutions as well as the packed column were allowed to stand in the cold room at 3° until equilibrated, and then the exchange was carried out in the cold. A solution prepared by dissolving 625 mg. of N,N'-dibenzylethylenediammonium bis-(3-hydroxy-3-methyl-5,5-dimethoxypentanoate) in 15 ml. of cold water (3°) was run through a column packed with 8 ml. of Amberlite IR–120 resin on the acid cycle at a rate of 0.3–0.4 ml. per minute. The column was washed with water until a total of 50.0 ml. of aqueous solution was collected. An ultraviolet absorption spectrum of the aqueous solution showed a maximum at 240 mu. indicating that some decomposition (which is probably dehydration) had occurred. By comparison with the maximum absorption obtained from a portion of this solution which had stood at room temperature for 30 hr., it appeared that the decomposition amounted to less than 3%.

3-hydroxy-3-methyl glutaraldehydic acid, 212 mg., prepared in aqueous solution as described above, was immediately placed under 2 to 3 atmospheres of hydrogen using 0.2 g. of platinum oxide catalyst and allowed to react for three days at room temperature. After removing the catalyst, the filtrate was concentrated in vacuo to about 10 ml. The residue contained mevalonic acid but to further purify it, it was converted to the DBED salt and subjected to recrystallization.

To do this the residue was treated with a solution of 210 mg. of dibenzylethylenediamine in 20 ml. of methanol. This solution stood 42 hours at room temperature and then was concentrated in order to remove the methanol. The concentrate was diluted with water and extrated with ether. Concentration of the aqueous solution in vacuo to dryness left 0.38 g. of residue which was crystallized from methanol and ether giving 142 mg. (34%) of N,N'-dibenzylethylenediammonium bis-(DL-mevalonate), M.P. 119–122°, reported M.P. 124–125°. This product gave no depression in melting point when mixed with an authentic sample and gave a microbiological activity (H. R. Skeggs, L. D. Wright, E. L. Cresson, G. D. E. MacRae, C. H. Hoffman, D. E. Wolf and K. Folkers, J. Bact., 72, 519 (195)) with *Lactobacillus acidophilus* strain ATCC 4963 equal to that of the authentic sample.

This product is again subjected to the above step of resin adsorption and elution, to obtain the DL-mevalonic acid in purified form.

EXAMPLE II

*Preparation of 3-methyl-3,5-dihydroxypentanoic acid (mevalonic acid) from N,N'-dibenzylethylenediammonium bis - (3-hydroxy-3-methyl-5,5-dimethoxypentanoate).—Reactions G and F*

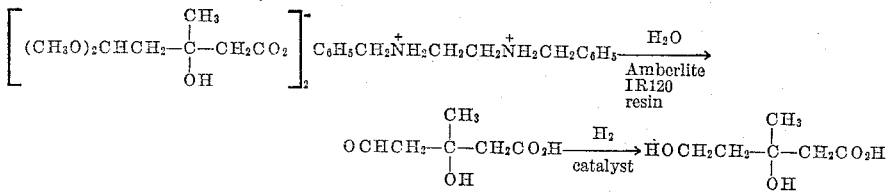

EXAMPLE III

*Preparation of 5-hydroxy-3-methyl-3-pentenoic acid.—Reactions H and 1 of I*

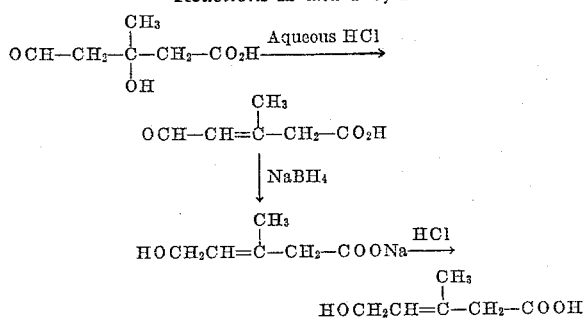

After 5 hours at room temperature, a solution of 193 mg. of 3-hydroxy-3-methyl glutaraldehydic acid in 30 ml. of 1.10 N hydrochloric acid showed an ultraviolet absorption peak at 240 mu. (1 ml. of original solution diluted to 250 ml., D=0.119). This showed that part of the original 3-hydroxy-3-methylglutaraldehydic acid had been dehydrated forming 5-aldo-3-methyl-3-pentenoic acid. The solution was made basic by the addition of 4 ml. of 1.0 N sodium hydroxide and 30 mg. of sodium borohydride in 3 ml. of 0.1 N sodium hydroxide was added. After 10 minutes, 4.5 ml. of 1.0 N hydrochloric acid was added. The ultraviolet absorption of this solution did not show a peak at 240 mu. This proved that the 5-aldo-3-methyl-3-pentenoic acid formed by the dehydration had been reduced to 5-hydroxy-3-methyl-3-pentenoic acid.

It is also possible to obtain 5-aldo-3-methyl-3-pentenoic acid by the addition of an acid to 3-hydroxy-3-methyl-5,5-dimethoxypentanoic acid, according to the following:

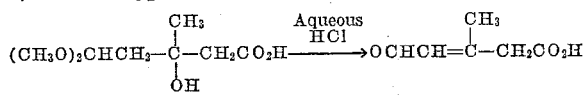

3-hydroxy-3-methylglutaraldehydic acid was prepared by adding one equivalent of hydrochloric acid to an aqueous solution of 3-hydroxy-3-methyl-5,5-dimethoxypentanoic acid, 69 mg. in 10.0 ml. of water, prepared as described in paragraph 1 of Example II above. The solution was allowed to stand at room temperature for 17 hours (at which time a 0.100 ml. portion diluted to 100.0 ml. of aqueous solution gave an ultraviolet absorption of 0.290 at λ max.=238–241 mu). The water was removed by lyophilization, and the residue was taken up in ethyl acetate. After removing the insolubles, the solution was concentrated in vacuo, and the remaining oil was tube distilled at about .1 mm. pressure. This is the 5-aldo-3-methyl-3-pentenoic acid.

*Mevalonic acid from 5-hydroxy-3-methyl-3-pentenoic acid.—Reaction 2 of I*

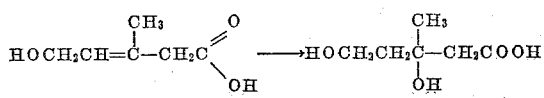

5-hydroxy-3-methyl-3-pentenoic acid (5.0 g.) is cooled in an ice bath and stirred while 4.7 g. of 80 percent sulfuric acid is added slowly. The stirring is continued for two hours while the temperature is maintained at 5–10°. The mixture is then poured onto cracked ice. An equivalent of barium chloride is added and the barium sulfate is removed by filtration. The aqueous filtrate is diluted with water and lyophilized. The residue is extracted with chloroform and it contains DL-mevalonic acid. To obtain the DL-mevalonic acid in purified form it is isolated as its crystalline N,N'-dibenzylethylenediamine salt by the procedure described above. The DL-mevalonic acid obtained by this procedure has the same microbiological activity as an authentic sample of DL-mevalonic acid.

What is claimed is:

1. 5-hydroxy-3-methyl-3-pentenoic acid.
2. The process for the production of mevalonic acid which comprises adding together in the presence of zinc and at reflux temperature a dialkylacetal of acetylacetaldehyde and a monohaloacetate to obtain their condensation and then adding an acid under iced conditions to produce hydrolysis and thereby obtain 3-hydroxy-3-methyl-5,5 dialkoxy pentanoate, adding a strong inorganic base to produce saponification and then adding a strong inorganic acid to bring about acetal cleavage and produce 3-hydroxy-3-methylglutaraldehydic acid, and liberating hydrogen in contact with said acid to reduce it to mevalonic acid.
3. The process for the production of mevalonic acid which comprises adding together in the presence of zinc and at reflux temperature a dialkylacetal of acetylacetaldehyde and a monohaloacetate to obtain their condensation and then adding an acid under iced conditions to produce hydrolysis and thereby obtain 3-hydroxy-3-methyl-5,5-dialkyoxy pentanoate, adding a strong inorganic base to produce saponification, adding an inorganic acid to neutral conditions to form 3-hydroxy-3-methyl-5,5 dialkyloxypentanoic acid, adding N',N' dibenzylethylenediamine to result in precipitation of the N',N' dibenzylethylenediamine salt of said acid, recovering said preciptate and adding it to a strong inorganic base and then a strong inorganic acid to bring about N',N' dibenzylethylenediamine and acetal removal to thereby produce 3-hydroxy-3-methylglutaraldehydric acid and liberating hydrogen in contact with said latter acid to reduce it to mevalonic acid.

References Cited in the file of this patent

UNITED STATES PATENTS

| | | |
|---|---|---|
| 2,415,558 | Hesler et al. | Feb. 11, 1947 |
| 2,652,369 | Fields | Sept. 15, 1953 |
| 2,658,070 | Schmidle et al. | Nov. 3, 1953 |

OTHER REFERENCES

Adams et al.: Organic Reactions, vol. 1, pages 1–37 (1942), pages 24–30 relied on.

Nakagawa et al.: Jr. Pharmac. Soc. Japan, page 985, vol. 77, No. 9, September 1957.

Wolf et al: J.A.C.S., vol. 79, No. 6, pages 1486–87 (1957).